Patented Apr. 15, 1947

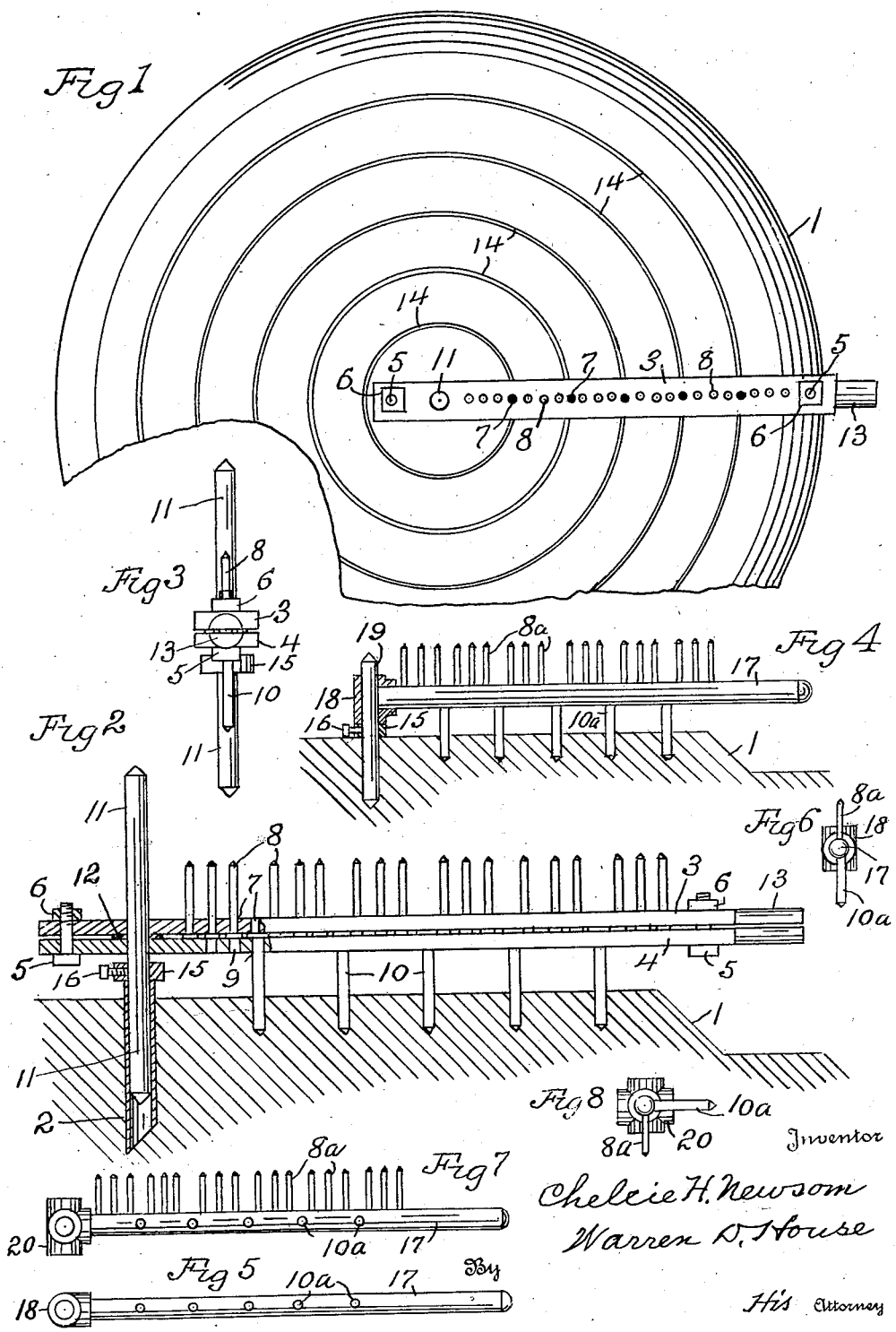

2,419,085

UNITED STATES PATENT OFFICE 2,419,085

CIRCULAR ROW MARKER AND CULTIVATOR

Chelcie H. Newsom, Kansas City, Mo.

Application May 28, 1945, Serial No. 596,175

1 Claim. (Cl. 97—136)

My invention relates to improvements in cultivating implements. It relates particularly to a cultivating implement adapted for use in cultivating a circular garden bed.

One of the objects of my invention is the provision of a novel implement of the kind described with which circular rows may be simultaneously made in which to plant the seeds, and after the seeds have sprouted, with which the soil between the rows may be easily and quickly cultivated.

Another object of my invention is the provision of a novel cultivating implement comprising an operating handle, carrying two longitudinal rows of cultivating devices respectively extending therefrom in two directions, combined with an anchoring means supported in the center of the bed to be cultivated, and novel means for removably pivoting the handle to the anchoring means in either of two horizontal positions, in either of which one of said rows of cultivating devices will be above the ground, and the devices of the other row will extend downwardly into the soil and will travel in concentric rows therein when the handle is swung on its axis.

Still another object of my invention is the provision of a novel cultivating implement of the kind described, which is simple, cheaply made, strong, durable, not likely to get out of order, which is easily and quickly operated by an unskilled person, and which is efficient in its operation.

The novel features of my invention are hereinafter fully described and claimed.

In the accompanying drawing which illustrates my invention,

Fig. 1 is a plan view of one form of my improved implement shown operatively mounted in a circular garden bed partly broken away, and in which the implement has made concentric rows in which to plant the seeds.

Fig. 2 is an enlarged side view, partly in elevation and partly in vertical section, of the form of implement, shown in Fig. 1, shown operatively mounted in the garden bed, a portion of which is shown in vertical section.

Fig. 3 is a reduced end elevation of the implement shown in Figs. 1 and 2, in which views the row making devices enter the soil.

Fig. 4 is a side view, partly in elevation and partly in vertical section, of another form of my invention, shown operatively mounted in a garden bed, a portion of which is shown in vertical section, the row making devices shown as engaging the soil.

Fig. 5 is a plan view of the handle shown in Fig. 4 looking at the side from which project the row making devices.

Fig. 6 is an end elevation of a portion of the implement shown in Figs. 4 and 5.

Fig. 7 is a side elevation of a portion of an implement embodying another form of my invention, in which the two rows of cultivating devices extend from the handle at right angles to each other, which handle is provided with means for pivotally engaging the form of anchoring means shown in Fig. 4.

Fig. 8 is an end elevation of what is shown in Fig. 7.

Similar characters of reference designate similar parts in the different views.

Referring to Figs. 1, 2 and 3, 1 designates a circular raised portion of a garden bed, in the center of which portion is mounted a vertical tubular anchoring member 2 having its upper end projecting slightly above the ground.

There is provided a handle comprising two longitudinal parallel members 3 and 4 which may be of suitable material and metal or wooden bars.

The members 3 and 4 are connected removably with each other by two transverse bolts 5 provided with nuts 6, which bolts are located respectively adjacent the opposite ends of the members 3 and 4.

The handle member 3 is provided therethrough with a longitudinal row of holes 7 adapted to have mounted in them a longitudinal row of cultivating devices, which as shown, are spikes 8 having heads located between the handle members 3 and 4, Fig. 2.

The handle member 4 is provided therethrough with a longitudinal row of holes 9, parallel with the holes 7 and in which are mounted cultivating devices, shown as spikes 10, the heads of which are located between the handle members 3 and 4 and between some of the heads of the spikes 8.

Means are provided for pivotally connecting the handle members 3 and 4 with the anchoring tubular member 2, which means, as shown, comprises a bar 11 which extends transverse through the bars 3 and 4, parallel with the spikes 8 and 10, and has projecting end portions adapted to be selectively pivotally mounted in the anchoring member 2. Fastened on the bar 11, and located between the handle members 3 and 4, is a collar 12, Fig. 2.

The bolts 5 and nuts 6 hold the handle members 3 and 4 tightly clamped against the collar 12 and the heads of the spikes 8 and 10.

The ends of the handle members 3 and 4 distant from the pivot bar 11 are arcuately rounded to form a handhold 13.

In operation, the projecting portion of the bar 11 at the side of the handle from which project the spikes 10, is inserted in the anchoring member 2, as shown in Fig. 2. The handle 3—4 will be horizontally disposed in one of its operative positions with the spikes 10 entering the soil. By then grasping the handhold 13 and swinging the handle in a circle, the spikes 10 will form concentric rows 14 in the circular portion 1 of the garden bed, as shown in Fig. 1.

The pivot bar 11 is then removed from the anchoring tube 2 and the seeds may be planted in the rows 14. After the seeds have sprouted and it is desired to cultivate between the rows of growing plants, the handle 3—4 is reversed and the other projecting end of the bar 11 is inserted into the anchoring tube 2, causing the spikes 8 to enter the soil. As shown in Fig. 2, the spikes 8 are located in the holes 7 so that some of the spikes 8 are located between the transverse planes of the spikes 10, whereby the spikes 8 will enter the ground between the spikes 10 and some at the outer sides of the end spikes 10, so that, when the handle 3—4 is swung in a circle, the spikes 8 will cultivate the soil between the rows 14 and at the outer side of said rows.

If it is desired to adjust the handle 3—4 to vary its distance from the ground, so that the spikes 8 or 10 may enter the ground at different depths, there is provided a collar 15 having a set screw 16, which collar is mounted on the projecting end portion of the pivot bar 11, and adjusted to a position vertically in which the spikes will enter the ground the desired amount, when the collar 15 rests on the upper end of the anchoring tube 2. In Fig. 2, the collar is shown mounted at the side of the handle from which extend the row making spikes 10. The collar 15 may be adjusted on the other protruding portion of the bar 11, when it is desired to adjust the depth the spikes 8 shall enter the soil. The nut 16 is tightened, when the collar 15 is so adjusted.

In the form of my invention shown in Figs. 4, 5 and 6, the handle comprises a single cylindrical wooden bar 17 having driven through it in one direction a longitudinal row of spikes 10a, which may be headless.

Another longitudinal row of spikes 8a are driven in the opposite direction through the handle 17, some of the spikes being disposed between the spikes 10a, and some at the outer sides thereof. The spikes 8a may also be headless.

For pivotally anchoring the handle 17, one end of the handle has mounted on it a T-joint 18 having a transverse hole through it parallel with the spikes 8a and 10a. In the center of the bed 1 is mounted a vertical bar 19.

When the spikes 10a are to be used to make concentric seed rows, as the rows 14 in Fig. 1, the handle 17 is disposed with the spikes 10a in the ground, as shown in Fig. 4, with the anchoring bar 19 extending through the T-joint 18, as shown. The free end of the handle 17 is then swung in a circle, causing the spikes 10a to make concentric seed receiving rows in the bed 1. The handle 17 is reversed with the spikes 8a extending downwardly into the soil, when it is desired to cultivate between the concentric rows made by the spikes 10a.

If it is desired to adjustably vary the depth of entrance of the spikes 10a and 8a into the soil, a collar 15 having a set screw 16, corresponding to the collar shown in Fig. 2, may be mounted on the anchoring bar 19, and adjusted to the desired position thereon, when either row of spikes is to be used.

When the collar 15 is employed, it supports the T-joint 18.

In the form of my invention, shown in Figs. 7 and 8, the handle comprises a single bar 17 corresponding to that of the form shown in Fig. 4. It also has driven through it transversely two longitudinal rows of spikes 8a and 10a, but the two rows are arranged at right angles to each other. The spikes 8a are disposed some between the planes of the spikes 10a and some at the outer sides of the spikes 10a, as in the form shown in Fig. 4, excepting that the rows of spikes are at an angle to, instead of parallel with each other.

In the form shown in Figs. 7 and 8 a T-joint 20 is mounted on one end of the handle 17. This T-joint 20 has through it at right angles to each other two holes, for selectively receiving the anchoring bar 19, shown in Fig. 4. These holes are respectively parallel with the spikes 8a and 10a.

In operation, the T-joint 20 is pivoted on the anchoring bar 19 with the spikes 10a extending into the soil. The spikes 8a are then disposed above the ground at right angles to the spikes 10a. The handle 17 is then operated to make the spikes 10a form concentric circles in the bed 1. The T-joint 20 is then removed from the anchoring bar 19. When the spikes 8a are to be used for cultivating between the concentric rows and at the outer sides thereof, the T-joint 20 is fitted on the anchoring bar 19 with the spikes 8a entering the soil, and the handle 17 is then swung in a circle, causing the spikes 8a to cultivate the soil.

Other modifications of my invention, within the scope of the appended claim, may be made without departing from the spirit of my invention.

What I claim is:

In a cultivating implement, a tubular anchoring member adapted to be mounted vertically in the ground, a handle comprising two longitudinal parallel members each having through it a longitudinal row of transverse holes parallel with each other and with the other row of holes, two rows of headed spikes respectively extending in opposite directions through said two rows of holes with their heads located between said handle members, a pivot bar extending through and having projecting portions extending from opposite sides of said handle members and having fastened to it a collar located between said handle members, and means releasably holding said handle members clamped against the heads of said spikes and against said collar, said projecting portions of said pivot bar being adapted for being selectively removably pivoted in said tubular anchoring member for pivotally mounting said handle in either of two horizontal positions, in either of which one of said rows of spikes will be above the ground, and the spikes of the other row will extend downwardly into the soil and travel in concentric rows when said handle is swung on its axis.

CHELCIE H. NEWSOM.

REFERENCES CITED

The following references are of record in the file of this patent:

UNITED STATES PATENTS

| Number | Name | Date |
|---|---|---|
| 743,981 | Hagen | Nov. 10, 1903 |
| 226,178 | Linderman | Apr. 6, 1880 |